United States Patent
Dutta et al.

(10) Patent No.: US 6,717,600 B2
(45) Date of Patent: Apr. 6, 2004

(54) PROXIMITY SELECTION OF SELECTABLE ITEM IN A GRAPHICAL USER INTERFACE

(75) Inventors: Rabindranath Dutta, Austin, TX (US); Don Rutledge Day, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 09/737,334

(22) Filed: Dec. 15, 2000

(65) Prior Publication Data

US 2002/0075333 A1 Jun. 20, 2002

(51) Int. Cl.[7] .................................................. G06F 3/14
(52) U.S. Cl. ....................................... 345/862; 345/856
(58) Field of Search ................................. 345/856–862

(56) References Cited

U.S. PATENT DOCUMENTS

| | | | |
|---|---|---|---|
| 5,638,092 A | | 6/1997 | Eng et al. .................... 345/168 |
| 5,687,331 A | | 11/1997 | Volk et al. ................... 395/327 |
| 5,786,818 A | | 7/1998 | Brewer et al. ............... 345/339 |
| 5,808,604 A | * | 9/1998 | Robin .......................... 345/862 |
| 5,870,079 A | * | 2/1999 | Hennessy .................... 345/159 |
| 6,075,531 A | * | 6/2000 | DeStefano ................... 345/788 |
| 6,091,395 A | * | 7/2000 | DeStefano ................... 345/862 |
| 6,219,028 B1 | * | 4/2001 | Simonson .................... 345/862 |
| 6,266,043 B1 | * | 7/2001 | Robin .......................... 345/858 |
| 6,559,872 B1 | * | 5/2003 | Lehikoinen et al. ........ 345/856 |

* cited by examiner

*Primary Examiner*—Cao Nguyen
(74) *Attorney, Agent, or Firm*—Marilyn Smith Dowkins

(57) ABSTRACT

The focus on a selectable item, such as a menu item, desktop icon, hyperlink, etc., changes based on proximity of the cursor. Whenever a portion of the area surrounding the cursor moves over a portion of the selectable item, the item can be selected upon a mouse click or other selection means. In addition, the displayed region or window or page is divided up into non-overlapping regions among the selectable items. When the cursor moves into one of the non-overlapping regions, the item associated with that region would be selected if a selection means were to be utilized. Furthermore, focus is changed to an item if a cursor moves toward it. As such, the direction of movement of the cursor predicts the item the user is moving towards. The item then becomes selectable.

13 Claims, 7 Drawing Sheets

PROXIMITY SELECTION OF SELECTABLE ITEM IN A GRAPHICAL USER INTERFACE

BACKGROUND OF THE INVENTION

1. Field of the Invention

This invention relates to user interfaces, and more specifically to a method, system, and program for enabling a selectable item to be selected if a displayed pointer is in proximity of the selectable item.

2. Description of the Related Art

Graphical user interfaces and pointing devices have greatly enhanced the usability and ease of use of computers and computer software, thereby increasing a typical user's efficiency and productivity. For example, pointing devices and displayed menu items enable a user to easily navigate through functions in an application program by merely moving a cursor controlled by a pointing device over a selectable item and "clicking" the pointing device, such as a button on a mouse, to make the selection. Likewise, merely moving a cursor over a hyperlink and selecting the hyperlink easily gets the desired linked document.

Controlling a cursor by moving a pointing device, e.g., a mouse, joy stick, light pen, and stylus, and making a selection when the cursor is over the selectable item is indeed convenient for most users in most environments.

However, some users may have physical or mental limitations that makes it difficult to position a cursor using a pointing device directly over a selectable item. For example, there are some physically challenged individuals who have more difficulty than others in using their hand and eye coordination to make fine motor movements to move the cursor over a relatively small selectable item. In some conditions, the hand may shake to such an extent that a cursor can not be positioned within the boundaries of the selectable item. In other conditions, a physically challenged user may not be able to stop movement of the cursor precisely on top of a selectable item. In addition, some vision impaired users may have difficulty in discerning the boundaries of a selectable item over which the cursor must be positioned.

Even for all users, having to position a mouse pointer or other pointer directly over a selectable item, including hyperlinks in a Web page, is inconvenient, tedious, and more time consuming than it need be. In addition, in some computing environments today, the typical user may have the same difficulties as the physically challenged users have been experiencing. For example, as the use of pervasive devices, such as hand held computing devices including palm pilots and telephony devices, increases; the typical user, with no apparent physical challenges, may now indeed experience difficulties in making selections upon the small screens of these computing devices. As these devices are used "on the move", i.e., in cars, walking, etc., it becomes even more difficult to focus one's eye's on the screen in order to make a selection directly over a selectable item.

It is therefore desirable to increase the accessibility of user interfaces not only for physically challenged users, but for all users in the various computing environments.

SUMMARY OF THE INVENTION

It is therefore an object of this invention to enable a selectable item to be selected when a displayed cursor is in proximity of the selectable item.

Embodiments including a system, method and program enable the focus on a selectable item, such as a menu item, desktop icon, hyperlink, etc., to change based on proximity of the cursor. The selectable item is chosen by hitting enter or pressing the mouse button, or by utilizing other known selection means. In a first embodiment, the region of clicking or hitting enter for a selectable item is associated with an area surrounding the displayed cursor. Whenever a portion of the area surrounding the cursor moves over a portion of the selectable item, the item can be selected upon a mouse click or other selection means. In another embodiment, the displayed region or window or page is divided up into non-overlapping regions among the selectable items. When the cursor moves into one of the non-overlapping regions, the item associated with that region would be selected if a selection means were to be utilized.

In yet another embodiment, focus is changed to an item if a cursor moves toward it. As such, the direction of movement of the cursor predicts the item the user is moving towards. The item then becomes selectable.

Although an item is also selectable when a cursor is positioned over the item, as is known in the art, the term "proximity" is used herein to refer to those positions of a cursor which are outside the edges or boundary of the displayed selectable item, itself.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
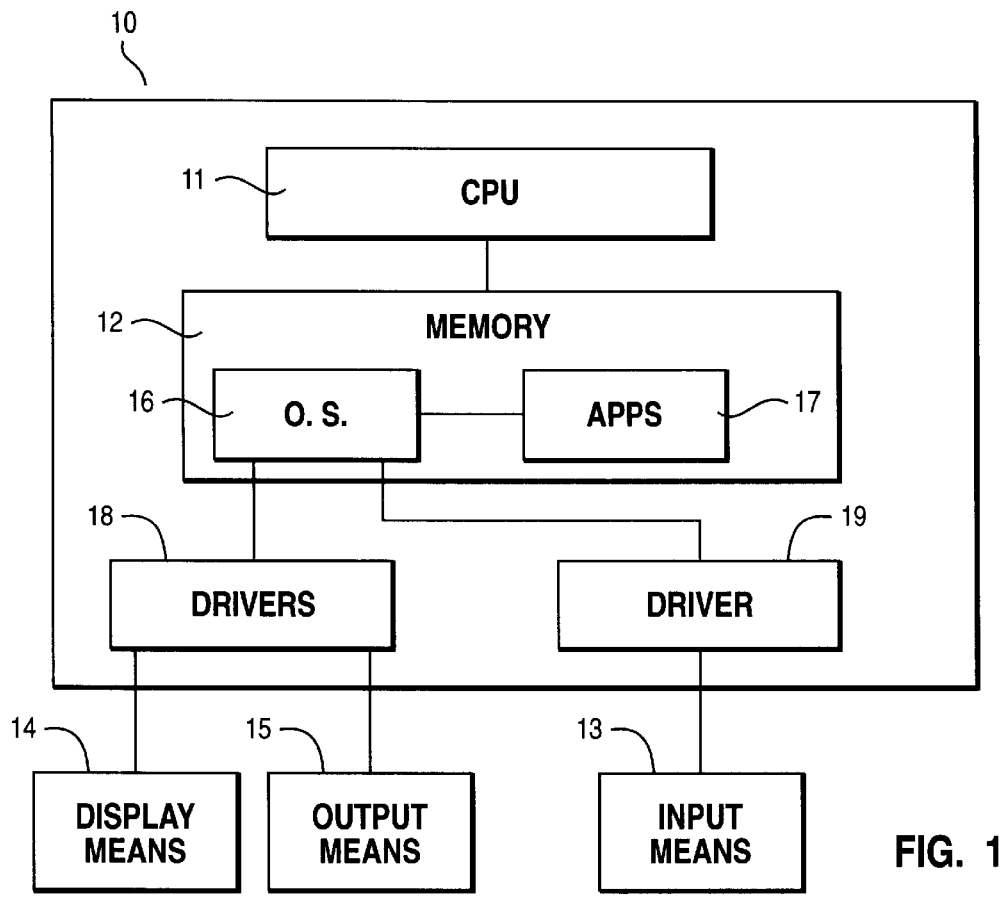
FIG. 1 is a block diagram of a computer system incorporating a preferred embodiment of the invention.

With reference now to the figures, and in particular with reference to FIG. 1, a high-level block diagram of a computer system 10 in which a preferred embodiment of the present invention may be implemented is depicted. The computer system 10 may be, but is not limited to, a personal computer, laptop, workstation, or hand held computer including palmtops, personal digital assistants, smart phones, cellular phones, etc. The computer system 10 includes at least one central processing unit 11 coupled to a memory system 12. Memory 12 includes volatile or nonvolatile storage and/or any combination thereof. Volatile memory may be any suitable volatile memory device, e.g., semiconductor memory such as RAM, DRAM, SRAM, etc. Nonvolatile memory may include storage space, e.g., via the use of hard disk drives, tapes, etc., for data databases, and programs. The programs in memory include an operating system 16 coupled to application programs 17. Operating system 16 and application programs 17 include instructions executed by CPU 11. Application programs may be word processing programs, spreadsheet programs, database programs, or other types of programs including browser programs. A browser program may be, for example, a web browser which allows a user to retrieve and view files on the World Wide Web (WWW), such as Internet Explorer browser program by Microsoft or Netscape browser program, or a program which performs a similar function on other networks.

The computer system 10 includes output means including display means 14 and/or any other output device 15 including communication devices and network communication devices. The computer system includes input means 13 such as a keyboard, mouse, joy stick, track ball, light pen, pen-stylus, touch sensitive device, and/or any other input means. The input means includes a selection means, such as a button on the mouse or joy stick or a separate button on a different input means, which triggers an action when activated. One such action is the selection of a selectable item. For example, a selection is made when a displayed cursor, controlled by a same or different input means, has been moved within a close proximity to the selectable item as described herein.

Input system 13 includes hardware and/or software (e.g., a driver program 19) which forms an interface between operating system 16 and input system 13. Display system 14 includes hardware and/or software (e.g., a driver program 18) which forms an interface between operating system 16 and display system 14 including a display monitor. Operating system 16 receives user input via input device and provides the user input to application program 17. Operating system 16 controls the movement of a cursor displayed upon display screen of a display monitor in response to signals received from an input device, and receives input selection signals from an input device at a current cursor location. The operating system sends the input selection signal to the application program 17 dependent upon the region of the display screen upon which a current cursor is positioned, or dependent upon the surrounding active region of the cursor as further described herein.

Figure 2A:
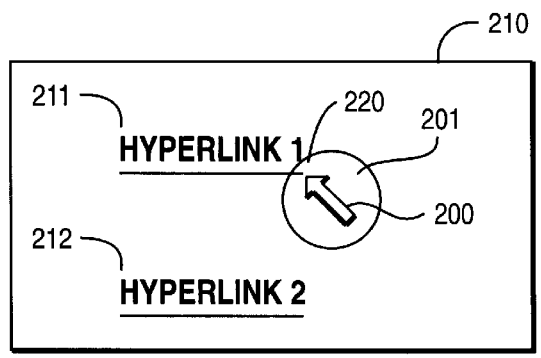
FIGS. 2A, 2B, 2C, and 2D illustrate displayed selectable items in conjunction with an active region surrounding the cursor that enable a selectable item to be selected when a cursor is in proximity to the selectable item.
Figure 2B:
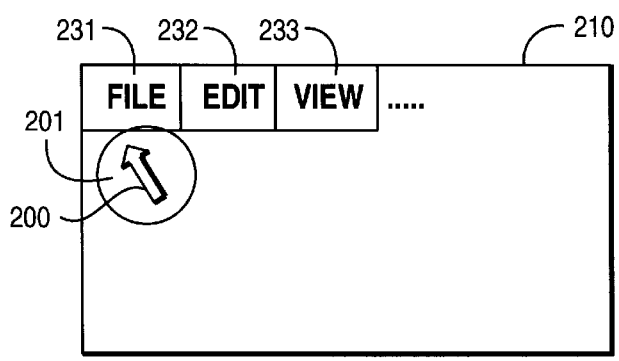
Figure 2C:
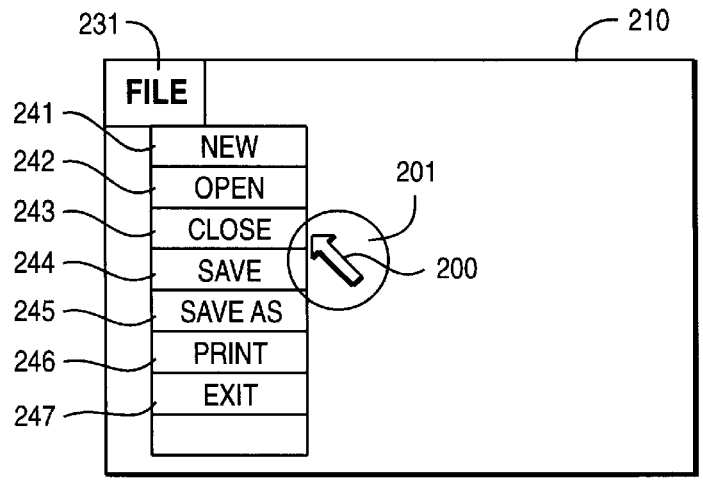

With reference to FIGS. 2A, 2B, and 2C, a first embodiment is described in which selectable items are displayed on a display screen 210. The selectable items can be selected using a cursor 200 which has an active region 201 surrounding it. As shown in FIG. 2A, if any portion of active region 201 intersects with a boundary of a selectable item, 211, 212, e.g., hyperlink 211, as shown by intersection 220, then the hyperlink would be selected if the user inputs a selection, e.g., using a mouse click with the cursor at the current position. Likewise, as shown in FIG. 2B, menu items 231, 232, 233 can be selected if a cursor 201 is in a certain close proximity to the menu item, such as FILE menu item 231. As long as a portion of the active region 201 surrounding the cursor 200 intersects with only one selectable item, then the selectable item can be selected if a selection input is received at that cursor location on the display screen.

It should be noted, as shown by FIG. 2C, that if the active region 201 of cursor 200 intersects with more than one selectable item, such as items 242, 243, 244, then the active region 201 becomes inactive and no selection input will be recognized unless the cursor 200 itself is on the selectable item. FIG. 2C, shows menu selections 241–247 under the File menu selection 231. These selectable items tend to be closer to each other such that overlap of the active region on multiple selectable items may be harder to avoid.

Figure 3:
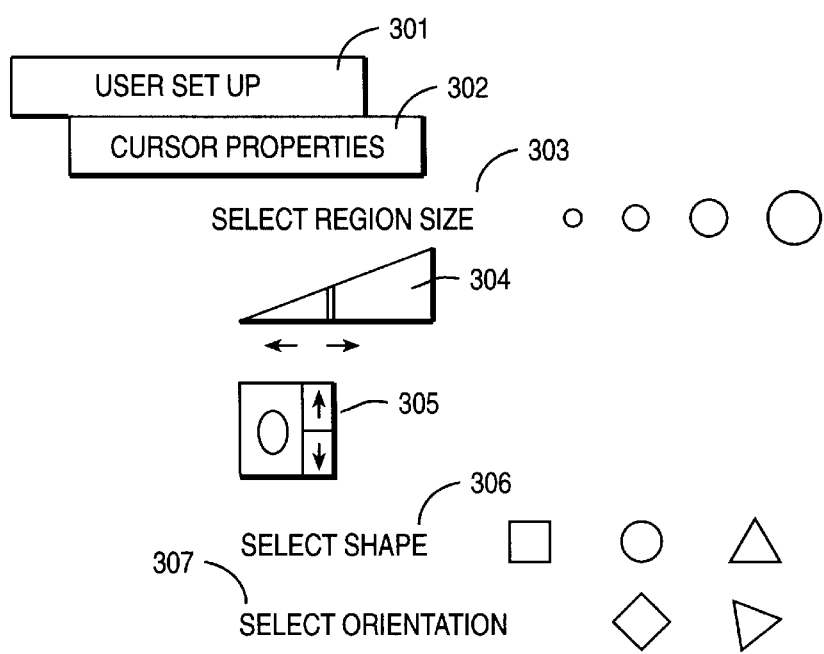
FIG. 3 illustrates several embodiments for setting a user preference as to the size, shape and orientation of the active region surrounding the cursor.

In order to optimize the advantages of using an active region surrounding the cursor to make input selections, while minimizing any difficulties associated with not being able to easily avoid overlapping the active region of the cursor with multiple selectable items, an option to set the size of the active region is provided to a user as shown in FIG. 3. The user set up option may be provided as part of an application program or as part of the operating system program. As shown in FIG. 3, cursor properties 302 can be pulled down by selecting user set up options 301. Under cursor properties 302, a user may select the active region size such as by making a selection on various sizes presented as shown at 303, by using a slider bar 304 to adjust the size, or by selecting a numerical size as shown at 305.

Figure 2D:
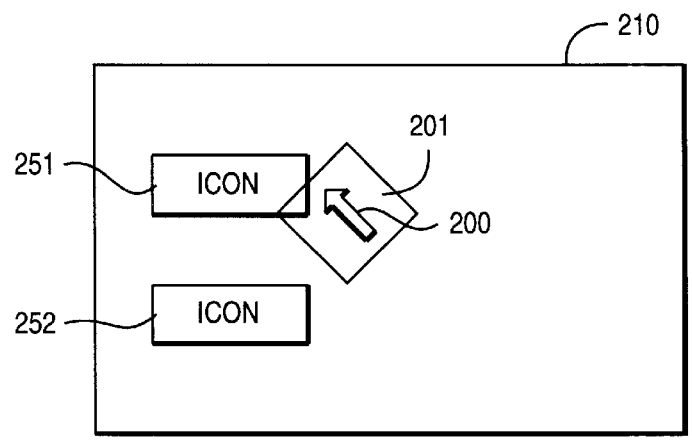

In addition, although the shape of the active region of the cursor was shown to be a circle in FIGS. 2A, 2B, and 2C, the active region could be any shape or orientation, as shown by user selection 306, 307 in FIG. 3. As shown in FIG. 2D, a square shape is used with 45 degree angular rotation. Various shapes, such as squares, triangles, etc., and various orientations may further enhance proximity selection of selectable items that are closely spaced to each other. For example, as shown in FIG. 2D, the active region 201 can more easily intersect selectable icon 251 without also intersecting with selectable icon 252 for a given range of motion of cursor 200.

Figure 4:
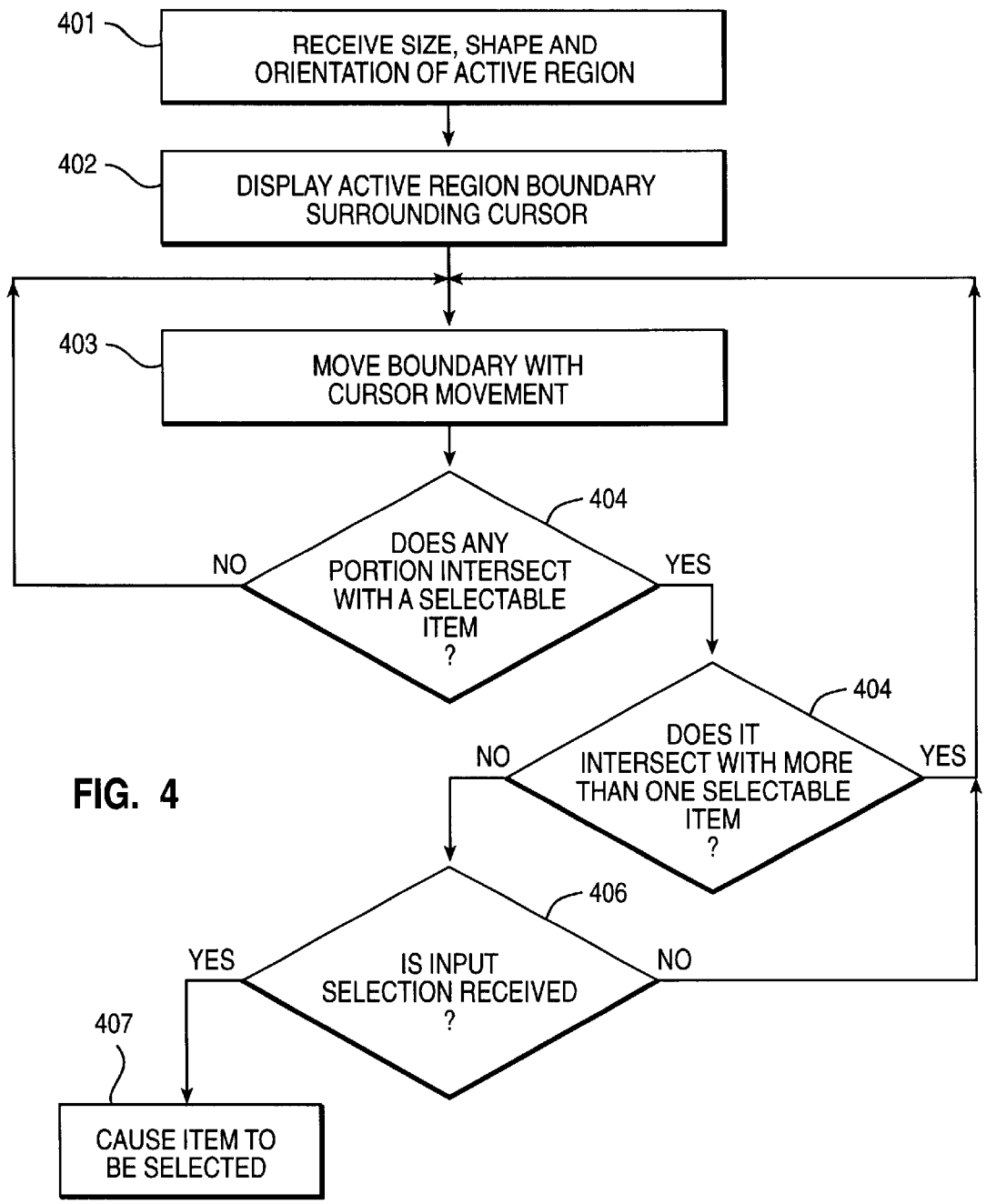
FIG. 4 illustrates logic used in utilizing an active region surrounding a cursor to make selections when a cursor is within a certain proximity of a selectable item.

FIG. 4 illustrates logic used in utilizing an active region surrounding a cursor to make selections when a cursor is within a certain proximity of a selectable item. The operating system program or application program receives a user preference specifying a size, shape, and orientation of an active region surrounding the cursor, 401. The operating system displays a boundary of the active region, 402; and moves the boundary along with any cursor movement, 403. The operating system determines if any portion of the active region intersects with a selectable item, 404. If it does not, it continues to move the boundary along with the cursor, 403. If there is an intersection with a selectable item at 404, the program determines if the active region intersects with more than one selectable item, 405. If it does, no input selection is recognized if any is received, and the program continues to move the boundary along with the cursor movement. If it is determined that the active region does not intersect with more than one selectable item, then it is determined if an input selection is received 406. If no input selection is received, the above loop continues with moving the boundary with any cursor movement at 403. If input selection is received at 406, then the selectable item, to which the cursor is in close proximity due to the active region intersecting with the selectable item, is caused to be selected, 407.

Figure 5A:
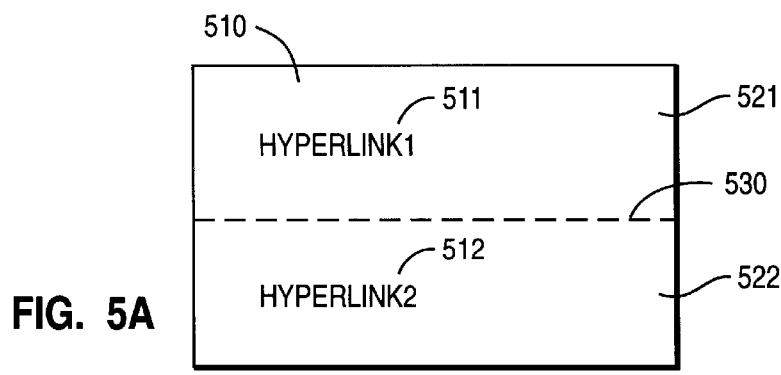
FIGS. 5A, 5B, and 5C illustrate displayed selectable items wherein each selectable item is within a separate non-overlapping allocated region that enables the selectable item to be selected when a cursor is in proximity to the selectable item.
Figure 5B:
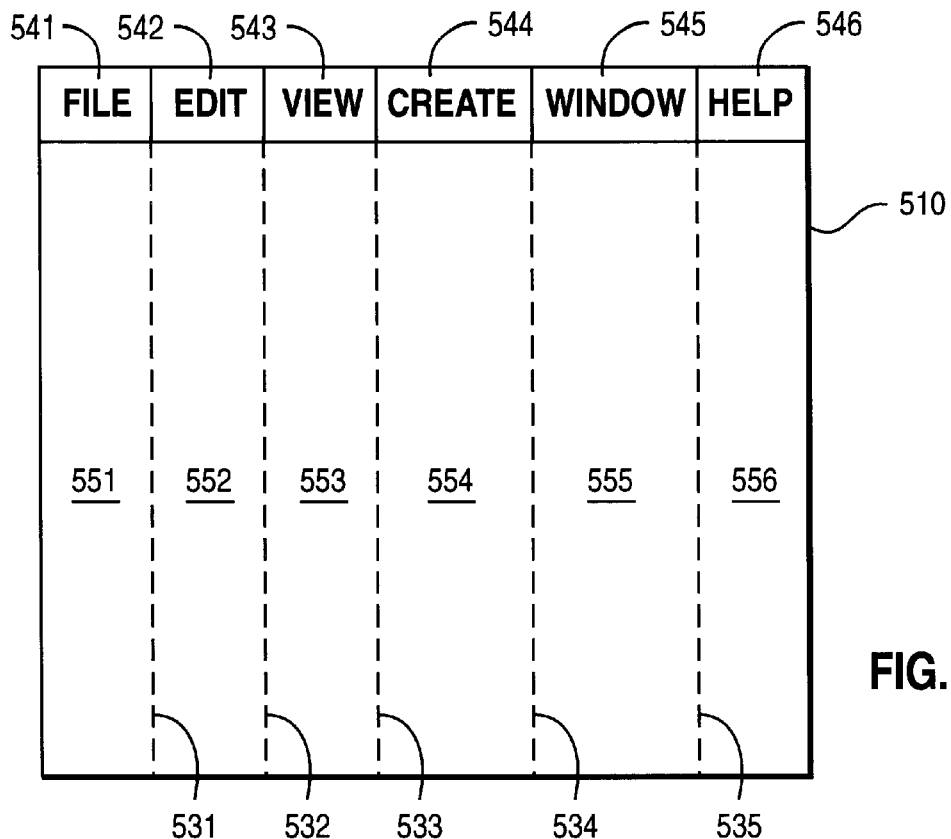
Figure 5C:
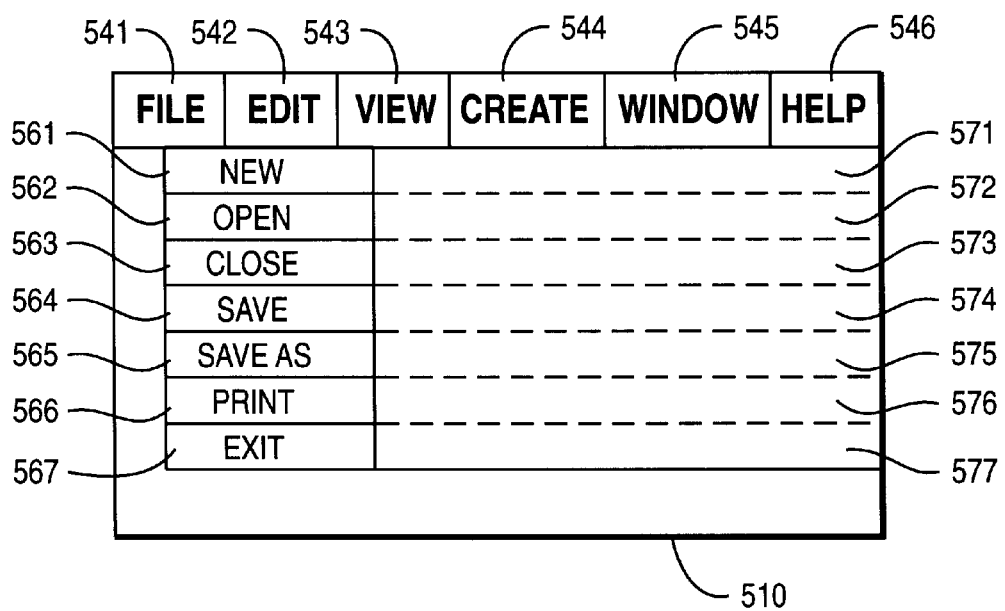

FIGS. 5A, 5B, and 5C illustrate displayed selectable items wherein each selectable item is within a separate non-overlapping allocated region that enables the selectable item to be selected when a cursor is in proximity to the selectable item. For example, FIG. 5A illustrates two hyperlinks 511, 512 on a displayed page. The page is divided up into non-overlapping regions 521, 522 with each region containing a separate hyperlink. At any time that the cursor is anywhere within the first region 521, hyperlink1 511 would be selected if an input selection, e.g., mouse click, is received. Likewise, at any time that the cursor is anywhere within the second region 522, hyperlink2 512 would be selected if an input selection is received. There is a boundary 530, that may be displayed or hidden, that separates the two regions.

Similarly, FIG. 5B illustrates menu items 541–546 displayed on display screen 510. There is a region 551–556 for each corresponding menu item 541–546. The regions 551–556 are separated by boundaries 531–535, which may be hidden or shown. Also, as shown in FIG. 5C, once the FILE menu item is pulled down, regions 571–577 are created and associated with each menu item 561–567. If the cursor is positioned anywhere within a region, the selectable menu item corresponding to that region is enabled to be selected.

The regions illustrated in FIGS. 5A, 5B, 5C may be arbitrarily determined. If the boundaries are arbitrarily determined, it would be desirable to display such boundaries in some way in order to guide the user in positioning the cursor in the necessary proximate location in order to enable the corresponding selectable item to be selected.

In a preferred embodiment, however, the display screen area is divided up into regions with selectable objects such that at any given point within a divided up region, that point is closer to the corresponding selectable item associated with that region than to any other selectable item.

One way in which to carry out the above is through the use of Voronoi diagrams. A Voronoi diagram is a geometric structure that represents proximity information about a set of points or objects. Given a set of sites or objects, the plane is partitioned by assigning to each point its nearest site. The points whose nearest site are not unique form the Voronoi diagram. That is, the points on the Voronoi diagram are equidistant to two or more sites.

Figure 6:
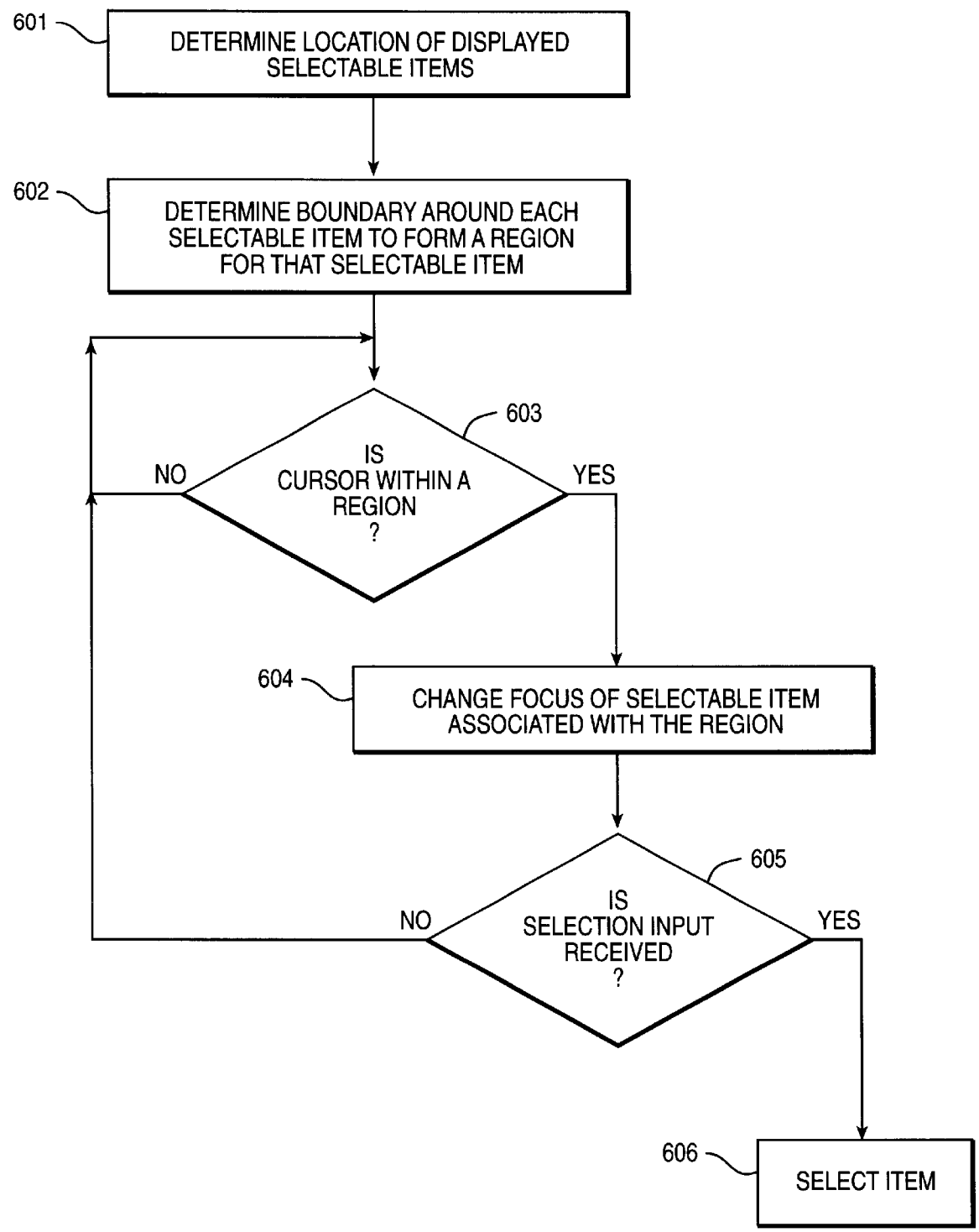
FIG. 6 illustrates logic used to change the focus of a selectable item when a cursor is within a certain proximity of a selectable item in accordance with a preferred embodiment of the invention which utilizes regions surrounding the selectable items.

FIG. 6 illustrates logic used to change the focus of a selectable item when a cursor is within a certain proximity of a selectable item in accordance with a preferred embodiment of the invention which utilizes regions surrounding the selectable items. The operating system or application program ("program") determines the location of each displayed selectable item, 601. The program determines a boundary around each selectable item to form a region for that selectable item, 602. The program monitors the current cursor position to determine if the cursor is positioned within a region, 603. If it is, then the focus of the selectable item associated with the region is changed to indicate that it would be selected if an input selection is received, 604. The program monitors whether an input selection is received, 605. If it is, the item is selected, 606.

Figure 7:
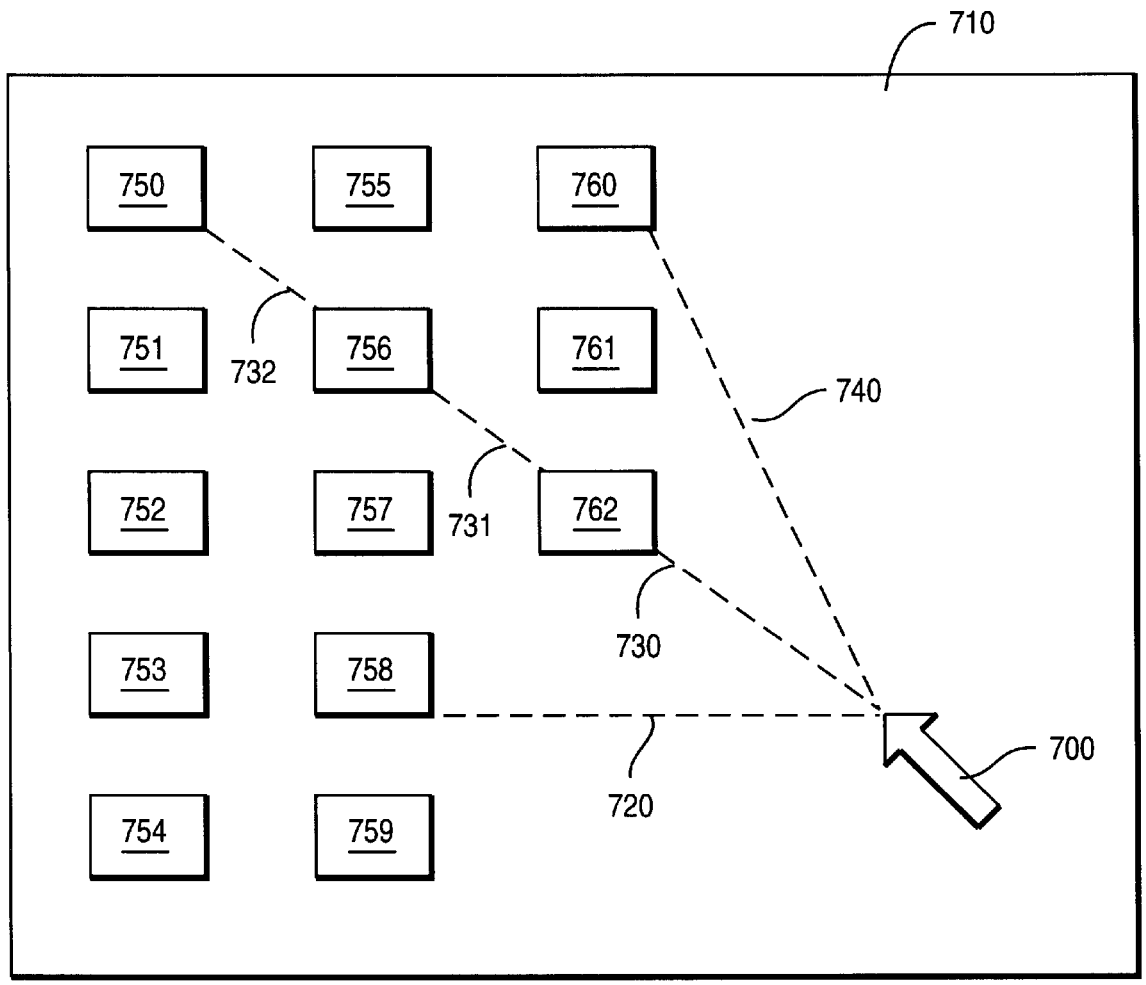
FIG. 7 illustrates displayed selectable items that are enabled to be selected when a cursor is in proximity to the selectable item by changing the focus of a given selectable item if a cursor moves in a direction toward the selectable item.

FIG. 7 illustrates displayed selectable items, such as icons 750–762 that are enabled to be selected when a cursor 700 is in proximity to the selectable item. The focus of a given selectable item is changed, i.e., enabled to be selected if an input selection is received, if a cursor moves in a direction toward the selectable item. For example, if cursor 700 is moved in a direction indicated by path 720, the focus of item 758 would be changed. Item 758 would be selected if an input selection were to be received anywhere along path 720. If cursor 700 is moved in a direction indicated by path 740, the focus of item 760 would be changed. Item 760 would be selected if an input selection were to be received when the cursor was positioned anywhere along path 740.

In this embodiment, the direction of movement of the cursor determines the selectable item that the user is moving towards. The focus of such selectable item changes if the cursor is just moving towards it. In yet a further embodiment, if movement continues in the same direction, without an input selection being received, for a predetermined amount of time or predetermined amount of movement of the cursor, then the focus would subsequently change to successive selectable items in that same direction path. For example, if cursor 700 moved along path 730, then the focus of icon 762 would change. If no input selection were received after a predetermined distance or time, and the cursor continued along path 730 and reached path 731; then the focus of icon 762 would revert back to normal, and the focus of icon 756 would change to indicate that it would be selected if an input selection were received. If no input selection were received after a predetermined distance or time, and the cursor continued along path 731 and reached path 732; then the focus of icon 756 would revert back to normal, and the focus of icon 750 would change to indicate that it would be selected if an input selection were received.

Figure 8:
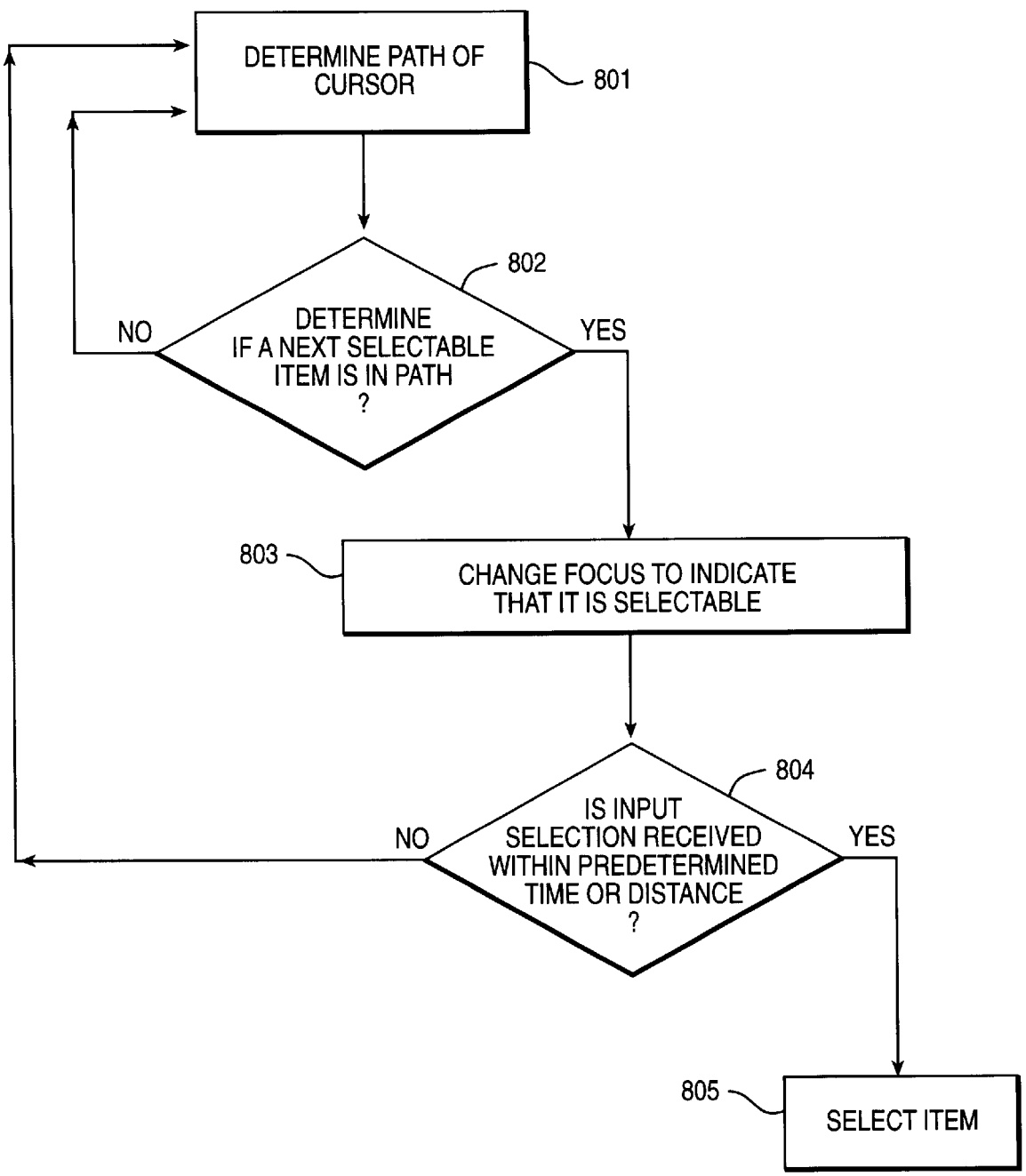
FIG. 8 illustrates logic used to change the focus of a selectable item when a cursor is in proximity to a selectable item in accordance with a preferred embodiment of the invention which changes the focus when the cursor moves toward the selectable item.

FIG. 8 illustrates logic used to change the focus of a selectable item when a cursor is in proximity to a selectable item in accordance with a preferred embodiment of the invention which changes the focus when the cursor moves toward the selectable item. First, the path of the cursor is determined, 801. Then it is determined if a next selectable item is in the path, 802. If not, processing continues to determine the path of the cursor and whether a next selectable item is in the path, 801, 802. When it is determined that a selectable item is in the path, the focus of the selectable item is changed, 803. The item is selected, 805, if an input selection is received within a predetermined time or cursor distance, 804, If no input selection is received, the processing continues to monitor the path of the cursor 801, and whether a next selectable item is in the path 802.

The above described preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EEPROMs), recordable type mediums such as floppy disks, hard disk drives and CD-RW and DVD-RW disks, and transmission type mediums such as digital and analog communication links, or any signal bearing media. As such, the functionality of the above described embodiments of the invention can be implemented in hardware in a computer system and/or in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for use in a CD ROM) or a floppy disk (for eventual use in a floppy disk drive), or downloaded via the Internet or other computer network, as discussed above. The present invention applies equally regardless of the particular type of signal-bearing media utilized.

The foregoing description of the preferred embodiments of the invention has been presented for the purposes of illustration and description. It is not intended to be exhaustive or to limit the invention to the precise form disclosed. Many modification and variations are possible in light of the above teaching.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A method for enabling a selection of a selectable item in a graphical user interface displayed on a computer display screen, comprising:

receiving a user definable fixed shape and size of an area surrounding a displayed moveable cursor;

for a given user defined area, i) enabling a selectable item to be selected when the cursor is moved and a portion of the user defined area surrounding the displayed cursor intersects with a portion of the selectable item;

ii) receiving an input selection when the selectable item is enabled to be selected; and iii) causing the selectable item to be selected.

2. The method of claim 1 wherein the step of enabling further comprises associating separate regions of the display area for each selectable item; and wherein the selectable item is enabled to be selected when the displayed cursor is moved within a separate region associated with the selectable item.

3. The method of claim 2 wherein the step of associating separate regions further comprises dividing up the displayed area to make the separate regions such that a cursor position within the given separate region is closer to a corresponding selectable item associated with the given separate region than to any other displayed selectable item.

4. A device having a processor, memory, a display screen, and means for enabling a selection of a selectable item in a user interface displayed on the display screen, comprising:

means for receiving a user definable fixed shape and size of an area surrounding a displayed moveable cursor;

means for enabling a selectable item to be selected when the cursor is moved and a portion of the user defined area surrounding the displayed cursor intersects with a portion of the selectable item;

means for receiving an input selection when the selectable item is enabled to be selected; and means for causing the selectable item to be selected.

5. The device of claim 4 wherein the means for enabling further comprises means for associating separate regions of the display area for each selectable item; and wherein the selectable item is enabled to be selected when the displayed cursor is moved within a separate region associated with the selectable item.

6. The device of claim 5 wherein the means for associating separate regions further comprises means for dividing up the displayed area to make the separate regions such that a cursor position within the given separate region is closer to a corresponding selectable item associated with the given separate region than to any other displayed selectable item.

7. The device of claim 4 wherein the selectable item is at least one of a menu item, task bar item, icon, and hyperlink.

8. The device of claim 4 wherein the means for receiving further comprises means for receiving a user definable orientation.

9. A program on a computer usable medium having computer readable program code means for enabling a selection of a selectable item in a user interface displayed on a display screen, comprising:

means for receiving a user definable fixed shape and size of an area surrounding a displayed moveable cursor;

means for enabling a selectable item to be selected when the cursor is moved and a portion of the user defined area surrounding the displayed cursor intersects with a portion of the selectable item;

means for receiving an input selection when the selectable item is enabled to be selected; and means for causing the selectable item to be selected.

10. The program of claim 9 wherein the means for enabling further comprises means for associating separate regions of the display area for each selectable item; and wherein the selectable item is enabled to be selected when the displayed cursor is moved within a separate region associated with the selectable item.

11. The program of claim 10 wherein the means for associating separate regions further comprises means for dividing up the displayed area to make the separate regions such that a cursor position within the given separate region is closer to a corresponding selectable item associated with the given separate region than to any other displayed selectable item.

12. The program of claim 9 wherein the selectable item is at least one of a menu item, task bar item, icon, and hyperlink.

13. The program of claim 9 wherein the means for receiving further comprises means for receiving a user definable orientation.

* * * * *